United States Patent [19]

Swamikannu et al.

[11] Patent Number: 5,436,296
[45] Date of Patent: Jul. 25, 1995

[54] COMPOSITIONS OF POLYMERIC MATERIALS INCLUDING POLYALKYLENE TEREPHTHALATES AND POLYETHYLENE

[75] Inventors: A. Xavier Swamikannu, Mount Prospect, Ill.; Murali K. Akkapeddi, Morristown, N.J.

[73] Assignee: AlliedSignal Inc., Morris Township, N.J.

[21] Appl. No.: 220,952

[22] Filed: Mar. 31, 1994

Related U.S. Application Data

[63] Continuation of Ser. No. 758,056, Sep. 12, 1991, abandoned.

[51] Int. Cl.$^6$ .............................................. C08L 67/02
[52] U.S. Cl. .................................... 525/166; 525/175; 525/176
[58] Field of Search ........................ 525/166, 176, 175

[56] References Cited

U.S. PATENT DOCUMENTS

| | | | |
|---|---|---|---|
| 3,692,744 | 9/1972 | Rich et al. | 260/75 |
| 4,172,859 | 10/1979 | Epstein | 428/402 |
| 4,284,540 | 8/1981 | Iida et al. | 260/22 |
| 4,461,871 | 7/1984 | Kometani | 525/166 |
| 4,656,094 | 5/1987 | Kojima et al. | 428/412 |
| 4,753,980 | 6/1988 | Deyrup | 524/369 |

FOREIGN PATENT DOCUMENTS

| | | |
|---|---|---|
| 0389797 | 2/1990 | European Pat. Off. |
| 45-030944 | 10/1970 | Japan |

OTHER PUBLICATIONS

Toughening of PET/HPDE Polyblends from Recycled Beverage Bottles, Chen et al., Antec 47, 1802 (1989).
Mechanical Dompatibilization of High Density Polyethylene-Poly(ethylene Terephthalate) Blends, Traugott et al., J. Appli. Polym. Sci., 28, 2947 (1983).
Encyclopedia of Polymer Science and Engineering, vol. 12, pp. 399–461, John Wiley & Sons, Inc., 1988.

*Primary Examiner*—Patricia A. Short
*Attorney, Agent, or Firm*—Michele G. Mangini; Roger H. Criss

[57] ABSTRACT

Compositions comprising polyalkylene terephthalate, polyethylene and a compatibilizer copolymer of a $C_2$–$C_{10}$ alpha-olefin and a glycidyl or isocyanate group-containing functional compound, wherein the functional compound comprises about 0.4 to about 50 weight percent of the compatibilizer copolymer, provide improved impact properties and heat resistance. The compositions feature improved compatibility of polyalkylene terephthalate and polyethylene, and are useful in forming a wide variety of articles therefrom.

20 Claims, No Drawings

COMPOSITIONS OF POLYMERIC MATERIALS INCLUDING POLYALKYLENE TEREPHTHALATES AND POLYETHYLENE

This application is a continuation of application Ser. No. 07/758,056 filed Sep. 12, 1991, now abandoned.

BACKGROUND

1. Field of the Invention

The present invention relates to compositions of polymeric materials including polyalkylene terephthalate and polyethylene; more particularly the present invention relates to compositions which include a polyalkylene terephthalate, a polyethylene and a compatibilizer.

2. Description of the Prior Art

Different thermoplastic polymers, in general, are not miscible and mere blending of two or more incompatible thermoplastic polymers results in phase separation and weak adhesion between different thermoplastic polymer phases. Consequently, an incompatible thermoplastic polymer blend tends to be brittle. Such incompatibility may be due to the differences in chemical structure, polarity, solubility parameter, or other inherent chemical or physical properties among different thermoplastic polymers.

Polyesters are polymeric materials typically made by a condensation reaction of dibasic acids and dihydric alcohols. Polyalkylene terephthalates, including polyethylene terephthalate, known to the art by its acronym "PET", polybutylene terephthalate, similarly referred to as "PBT", and mixtures thereof, are aromatic polyesters which have excellent barrier properties, chemical resistance, dimensional stability, abrasion resistance, and relatively high resistance. However, polyalkylene terephthalates, especially PET, tend to become brittle upon crystallization. Consequently, a major deficiency of PET is its poor ductility and impact resistance. In addition, the high modulus of crystalline PET precludes the polymer from flexible applications such as tubing and jacketing applications.

There have been numerous attempts to improve the impact properties of polyalkylene terephthalates. U.S. Pat. No. 4,172,859 to Epstein, U.S. Pat. No. 4,284,540 to Iida et al, and U.S. Pat. No. 4,753,980 to Deyrup are examples of various efforts in attempting to improve the impact properties of polyalkylene terephthalates by adding a third component selected from a variety of impact modifiers. For example, U.S. Pat. No. 4,753,980 discloses compositions utilizing an ethylene/n-butylene acrylate/glycidyl methacrylate terpolymer impact modifier to produce toughened polyester.

Polyethylenes are ethylene-based polyolefin polymers. Although polyethylenes can be linear or branched, most widely used polyethylenes are linear polyethylenes. Linear polyethylenes are classified by density, and they include low-density polyethylene (LDPE), linear low density polyethylene (LLDPE), medium-density polyethylene (MDPE), high-density polyethylene (HDPE), and the like. Polyethylenes are characterized by their toughness, near-zero moisture absorption, excellent chemical resistance, excellent electrical insulating properties, low coefficient of friction, and ease of processing. On the other hand, poor load-bearing, poor gas barrier characteristics and relatively poor heat resistance are the main undesirable properties of polyethylenes.

Because of the useful properties of the two polymers, there have been numerous attempts to blend polyalkylene terephthalates with polyethylenes in order to combine the useful characteristics of the two polymers. These two polymers are highly incompatible since they have significantly different solubility parameters, critical surface tension characteristics, polarity and other incompatible chemical properties. Blending of the two incompatible polymers results in a phase separated blend that exhibits poor mechanical properties, especially impact properties. Such a phase separated blend also has less than desirable thermal properties since the polymers in the blend tend to independently exhibit their inherent thermal properties, leading to thermal degradation of the blend at the lower melting temperature of the two polymer.

Various efforts have been expended in utilizing thermoplastic elastomers to improve the compatibility of polyalkylene terephthalates and polyethylenes. For example, Traugott et al, J. Appli. Polym. Sci., 28, 2947 (1983) teaches polyethylene terephthalate and high density polyethylene (PET/HDPE) blends of improved ductility. The disclosure reports a series of blend compositions utilizing up to 20 weight percent of elastomers—a styrene/ethylene-butadiene/styrene triblock copolymer (SEBS) and an ethylene-propylene copolymer elastomer. Chen et al, ANTEC 47, 1802 (1989) reports that the addition of an acid group grafted SEBS elastomer to a PET/HDPE blend results in improved impact properties. While providing beneficial compositions, these compositions known to the art require a large proportion of the thermoplastic elastomers, which may act to diminish other desirable physical properties of the blend compositions, such as impact properties and thermal stabilities, or require specialized elastomers. European Patent 389797 discloses a polyester-polyolefin blend molding composition that utilizes a modified polyolefin and a multifunctional epoxy compound. This composition may provide a useful way to produce polyester-polyethylene blends. However, the composition requires an additional processing step of modifying the polyethylene to have an epoxy reactive moiety.

There exists a continuing need for blend compositions of polyalkylene terephthalate and polyethylene that exhibit improved ductility and heat resistance over the blends known to the art.

3. SUMMARY OF THE INVENTION

According to the present invention, there is provided a thermoplastic blend composition, which forms a polyalkylene terephthalate continuous matrix, based on the total weight of the blend composition, comprising from about 35 to about 95 weight percent of a polyalkylene terephthalate, from about 1 to about 50 weight percent of a polyethylene, and from about 5 to about 15 weight percent of a compatibilizer copolymer comprising a $C_2$-$C_{10}$ alpha-olefin and a functional group-containing compound of the following structure:

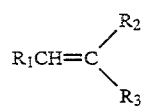

wherein $R_1$ and $R_2$ independently are H or an alkyl group having 1–12 carbon atoms, and $R_3$ is selected from the group consisting of:

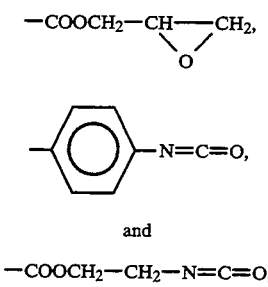

and

—COOCH$_2$—CH$_2$—N=C=O, wherein said functional compound comprises from about 0.4 to about 50 weight percent of the compatibilizer copolymer.

The compositions of the present invention requires less amounts of the third, compatibilizer component than the compositions of the prior art while simultaneously providing increased impact properties. In addition, it has been discovered that the addition of an appropriate amount of the glycidyl group-containing copolymer of the present invention facilitates the formation of a continuous matrix of polyalkylene terephthalate, thereby improving impact properties and heat resistance of the blend.

4. DESCRIPTION OF THE PREFERRED EMBODIMENTS

The present invention provides blend compositions of polyalkylene terephthalates and polyethylenes that exhibit high impact properties and heat resistance. Such compositions comprise a polyalkylene terephthalate and a polyethylene, and a third compatibilizer component that has at least two different functional groups to which the polyalkylene terephthalate and polyethylene can bind, thereby compatibilizing the two polymers.

The polyalkylene terephthalates of this invention are thermoplastic polyester resins which include the reaction products of terephthalic acid, as well as derivatives thereof, and aliphatic or cycloaliphatic $C_2$–$C_{10}$ diols. Such reaction products include polyalkylene terephthalate resins, including polyethylene terephthalate, polybutylene terephthalate, polytetramethylene terephthalate, and copolymers and mixtures thereof. As is known to the art, these polyester resins may be obtained through the polycondensation reaction of terephthalic acid, or a lower alkyl ester thereof, and an alkylene diol. By way of example, as is known, polyethylene terephthalate or polybutylene terephthalate may be produced by polycondensation of dimethyl terephthalate and ethylene glycol or 1,4-butane diol, respectively, after an ester interchange reaction.

Preferred polyalkylene terephthalates include at least 75 mol %, preferably not less than 80 mol %, of terephthalic acid groups as based on the dicarboxylic acid component. Preferred polyalkylene terephthalates include at least 75 mol %, preferably not less than 80 mol %, of the aliphatic $C_2$–$C_{10}$ or cycloaliphatic $C_6$–$C_{21}$ diol component. Of these, preferred polyalkylene terephthalates are polyethylene terephthalate and polybutylene terephthalate; most preferred is polyethylene terephthalate.

The preferred polyalkylene terephthalates may contain up to about 25 mol % of groups of other aliphatic dicarboxylic acids having from about 4 to about 12 carbon atoms as well as aromatic or cycloaliphatic dicarboxylic acid groups having from about 8 to about 14 carbon atoms inclusive. Non-limiting examples of these monomers include the following: isophthalic acid, phthalic acid, succinic acid, adipic acid, sebacic acid, azelaic acid, cyclohexane diacetic acid, naphthalene-2,6-dicarboxylic acid, 4,4-diphenylenedicarboxylic acid, as well as others not particularly denoted here.

Preferred polyalkylene terephthalates may also contain up to 25 mol % of other aliphatic $C_2$–$C_{10}$ or cycloaliphatic $C_6$–$C_{21}$ diol components. By way of example and not by way of limitation, examples include: neopentyl glycol, pentane-1,5-diol, cyclohexane-1,6-diol, cyclohexane-1,4-dimethanol, 3-methyl pentane-2,4-diol, 2-methyl pentane-2,4-diol, propane-1,3-diol, 2-ethyl propane-1,2-diol, 2,2,4-trimethyl pentane-1,3-diol, 2,2,4-trimethyl pentane-1,6-diol, 2,2-diethyl propane-1,3-diol, 2-ethyl hexane-1,3-diol, hexane-2,5-diol, 1,4-di($\beta$-hydroxy-ethoxy-)benzene, 2,2-bis-(4-hydroxypropoxyphenyl)propane, as well as others which are not particularly denoted here.

The polyalkylene terephthalates may be either straight or branched in their configuration. They may be branched by the inclusion of small quantities of trihydric or tetrahydric alcohols, or tribasic or tetrabasic carboxylic acids, including those described in U.S. Pat. No. 3,692,744 to Rich et al. Preferred among these include: trimellitic acid, trimethylol-ethane, trimethylol-propane, trimesic acid, and pentaerythritol.

The compositions according to the present invention include a polyethylene resin. Polyethylenes denote a group of ethylene-based polyolefin polymers. Although polyethylenes can be linear or branched, most widely used polyethylenes are linear polyethylenes. Linear polyethylenes are classified by density, and they include low-density polyethylene (LDPE), linear low density polyethylene (LLDPE), medium-density polyethylene (MDPE), high-density polyethylene (HDPE), and the like. Preferred polyethylene resins include homopolymers such as low, medium and high density polyethylenes; copolymers having a major proportion of ethylene, generally at least about 60 weight %, preferably at least about 70 weight %, and other alpha-olefins containing 3–10 or more carbon atoms; and mixtures thereof. Illustrative but not limiting examples of such other alpha-olefins are propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethylbutene-1, and the like. Of these, the most preferred polyethylene is high density polyethylene. High density polyethylene denotes both ethylene homopolymers as well as ethylene copolymers with other alpha olefins, having a density of about 0.940 g/cm$^3$ and higher. The preferred copolymers of high density polyethylene may contain up to about 10 weight %, more preferably up to about 5 weight %, of other alpha-olefins, such as the ones disclosed above.

In accordance with the present invention, virgin and/or reprocessed polyalkylene terephthalate and polyethylene can be utilized.

The compositions according to the present invention further comprise a compatibilizer component. The compatibilizer component suitable for use in conjunction with the present invention includes a glycidyl group-containing copolymer which comprises an alpha-olefin selected from the $C_2$–$C_{10}$ alpha-olefins, preferably ethylene, propylene or butylene, of which ethylene is most preferred, and a glycidyl ester of an alpha, beta-ethylenically unsaturated carboxylic acid which may be represented by the formula:

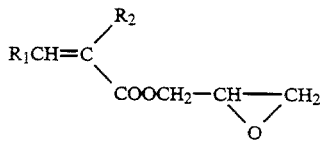

wherein:
$R_1$ may be H, $CH_3$,

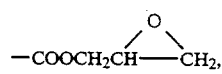

or an alkyl group having 1-12 carbon atoms, and $R_2$ is H or an alkyl group having 1-12 carbon atoms. Preferably, $R_1$ and $R_2$ independently are H or an alkyl group with 1-2 carbon atoms. Most preferably, $R_1$ is H and $R_2$ is a methyl group.

The glycidyl group-containing copolymers preferably include a glycidyl unit of an alpha, beta-ethylenically unsaturated carboxylic acid in an amount between about 0.4 and about 50 weight %, more preferably from about 0.8 to about 30 weight %, and most preferably in the range of between about 2 to about 25 weight % based on the total weight of the copolymer. The glycidyl group-containing copolymer may be produced by known copolymerization or graft copolymerization techniques to form copolymers therefrom which may be of any configuration, including straight and branched configurations. The glycidyl group-containing copolymer may be characterized by having a melt index measured according to ASTM D-1238-91b testing protocol at test condition 190/2.16 of between about 0.01 and about 100 gm/10 min, preferably between about 0.05 to about 50 gm/10 min, and most preferably between about 0.1 and about 35 gm/10 min.

Preferred glycidyl group-containing copolymers suitable for use in conjunction with the present invention are selected from the group which includes: ethylene/glycidyl acrylate, ethylene/glycidyl methacrylate, ethylene/vinyl acetate/glycidyl methacrylate, and ethylene/vinyl acetate/glycidyl acrylate. Of these, the most preferred is a copolymer of ethylene/glycidyl methacrylate.

An alternative compatibilizer component according to the present invention includes an isocyanate functional group-containing copolymer of alpha-olefin. Such an isocyanate functional group-containing copolymer comprises an alpha-olefin selected from the $C_2-C_{10}$ alpha-olefins including ethylene, propylene and butylene, of which ethylene is most preferred, and an isocyanate functional group-containing monomer of the following structure:

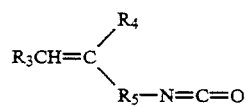

wherein $R_3$ and $R_4$ may independently be H or an alkyl group having 1-12 carbon atoms, and $R_5$ is phenylene or $—COOCH_2—CH_2—$.

Preferably, the compositions of the present invention comprise, based on the total weight of the polyalkylene terephthalate, polyethylene and the third compatibilizer component, between about 35 and about 95 weight % of polyalkylene terephthalate, between about 1 and about 50 weight % of polyethylene and between about 5 and about 15 weight % of the third compatibilizer component. More preferably, the compositions comprise, based on the total weight of the composition, between about 50 and about 65 weight % of polyalkylene terephthalate, between about 20 and about 40 weight % of polyethylene and between about 8 and about 12 weight % of the third compatibilizer component.

It has been found that the compositions of the present invention requires less amount of the third, compatibilizer component than the compositions of the prior art while simultaneously providing improved impact and thermal properties. In addition, it has surprisingly been found that adding the glycidyl group-containing copolymer in the composition in the preferred range of the present invention facilitates the formation of a continuous matrix of polyalkylene terephthalate with dispersed polyethylene domains, whereas adding the glycidyl group-containing copolymer below or above the preferred range results in the formation of a continuous matrix of polyethylene. While not wishing to be bound by any theory, it is believed that the continuous matrix of polyalkylene terephthalate forms as a result of compatibilizing the two main polymers when a sufficient amount of the glycidyl group-containing copolymer within the preferred range is present in the composition. It is further believed that the addition of the glycidyl group-containing copolymer above the preferred range increases the viscosity of the resulting blend such that the viscosity increase causes the inversion of the two polymer matrix.

It is believed that compatibilization of polyalkylene terephthalate and polyethylene by the glycidyl group-containing copolymer is achieved when the glycidyl end of the glycidyl group-containing copolymer reacts with the carboxylic end of the polyester in the polyester phase of the blend and the ethylene portion of the copolymer binds with the polyethylene phase. The resulting adhesion between the two polymer phases in the blend through the compatibilizing effect of the glycidyl group-containing copolymer serves as a mechanism for improved stress transfer between the two phases with a resulting improvement in the overall impact properties of the blend. It is also believed that when a blend forms a continuous matrix of one polymer containing distributed domains of another polymer, the distributed domains act as stress dissipation points. In accordance with these hypotheses and the afore-mentioned inherent physical properties of polyalkylene terephthalate and polyethylene, a compatible polyalkylene terephthalate and polyethylene blend having a continuous polyalkylene terephthalate matrix with dispersed polyethylene domains has improved impact properties compared to a blend having a continuous polyethylene matrix with dispersed polyalkylene terephthalate or a blend having no continuous matrix.

Furthermore, it has been found that an article formed from the blend composition of the present invention having a continuous polyalkylene terephthalate matrix with dispersed polyethylene domains exhibits improved heat resistance over an article formed from a blend having a continuous polyethylene matrix with dispersed polyalkylene terephthalate or from a blend having no continuous matrix. It is believed that when an article formed from the blend of the present invention is exposed to a temperature beyond the melting point of polyethylene, the continuous polyalkylene terephthalate matrix, which has substantially higher melting point and, thus, has a substantially higher heat resistance than a polyethylene matrix, contains the softened polyethylene domains within its formation. Consequently, the continuous polyalkylene terephthalate matrix preserves the physical integrity of the articles formed from the blend of the present invention as demonstrated by the high vicat softening temperature of the blend of the present invention as evidenced in the accompanying examples.

The presence of such a continuous matrix was tested by a solvent solubility test. Polyethylene is soluble in aliphatic and aromatic hydrocarbon solvents, such as xylene, at above 80° C., while polyethylene terephthalate is soluble in phenol/tetrachloroethane (60/40 volume/volume ratio). Therefore, a blend having a continuous polyethylene terephthalate matrix with dispersed polyethylene is insoluble in xylene while soluble in phenol/tetrachloroethane; a blend having a continuous polyethylene is insoluble in phenol/tetrachloroethane while soluble in xylene; a blend without a continuous matrix is soluble in both xylene and phenol/tetrachloroethane.

The compositions of the present invention may further include one or more conventional additives such as stabilizers and inhibitors of oxidative, thermal, and ultraviolet light degradation; lubricants and mold release agents; colorants including dyes and pigments; fibrous and other fillers and reinforcements; nucleating agents; plasticizers; flame retardants; and the like. Below are merely illustrative of many additives.

The oxidative and thermal stabilizers useful in the present invention include, for example, Group I metal halides, e.g., sodium, potassium, lithium with cuprous halides, e.g., chloride, bromide, iodide; hindered phenols; hydroquinones, and varieties of substituted members of those groups and combinations thereof.

The ultraviolet light stabilizers useful in the present invention include various substituted resorcinols, salicylates, benzotriazoles, benzophenones, and the like.

Suitable lubricants and mold releasing agents include stearic acid, stearyl alcohol, and stearamides. Suitable organic dyes include nigrosine, while suitable pigments include titanium dioxide, cadmium sulfide, cadmium selenide, phthalocyanines, ultramarine blue, carbon black, and the like. Suitable fillers include carbon fibers, glass fibers, amorphous silica, asbestos, calcium silicate, aluminum silicate, magnesium carbonate, kaolin, chalk, powdered quartz, mica, feldspar, and the like.

Suitable flame retardants include organic halogenated compounds such as polybrominated diphenylethers, e.g., decabromodiphenyl ether, octabromodiphenyl ether, brominated phthalate esters and the like.

Blending or mixing of the constituents which comprise the composition may be accomplished by any effective means which will provide a uniform dispersion. All of the constituents may be mixed simultaneously or separately by a mixer, blender, kneader, roll, extruder, or the like in order to assure a uniform blend of the constituents, and the resultant mixture is melt-kneaded with the remaining constituents in an extruder or the like to make a uniform blend. The most common method is melt-kneading a previously dry-blended composition further in a heated extruder provided with a single or, in the alternative, a plurality of screws to extrude the uniform composition into strands, and subsequently chopping the extruded strands into pellets.

The composition of the present invention may be used for the production of conventional articles formable from thermoplastic materials. By way of example and not of limitation, such articles include sheets, films, tubings, hoses, wire and cable jacketing, profiled shapes, coatings, parisons for blow molding, as well as others not particularly denoted here. Typically, the composition will be used to form products by extruding or injection molding a quantity of the composition, which has been previously produced, such as by an extrusion process into pellets, by first heating the preformed pellets to a fluid melt under the action of applied heat, compression and shear effects, and subsequently forcing a quantity of the melted composition into a mold or form where it is allowed to solidify.

The invention is more easily understood by reference to specific embodiments which are representative examples according to the teachings of the instant invention. It is to be understood, however, that the specific embodiments discussed herein are provided only for the purpose of illustration, and not by way of limitation, and it is to be further understood that the invention may be practiced otherwise than specifically described and yet be within the scope of the present invention.

EXAMPLES 1-6

The compositions of the examples were generally formed in accordance with the process and apparatus described below. In the following examples, all references to a percentage of a constituent in a composition are the weight percentage of the referenced constituent relative to the total weight of the composition. Particular exceptions to this convention are noted.

According to a particular example's composition, a polyethylene terephthalate, having an intrinsic viscosity of 0.68-0.75 dl/g measured in phenol/tetrachloroethane (60/40 v/v) solution which was dried in vacuum for 3 days at 155° C., and a high density polyethylene, having a melt index of about 20 g/10 min which was dried for 2 days at 155° C. in a convection oven, were mixed in a rotary mill. As the third, glycidyl group-containing compatibilizer component, an ethylene/glycidyl methacrylate copolymer described below in Table 1 was fed together with the above polyethylene terephthalate and polyethylene mixture to a Killion extruder having a one inch (2.54 cm) single screw equipped with a high compression screw having a L/D ratio of 24/1, a mixing head, and a Nematic static mixer and extruded into strands which were subsequently chopped to form uniform sized pellets. The extruded pellets were dried at 80° C. under vacuum for 16 hours. The compositions of the Examples 1-6 are described in Table 1.

The temperature profile across the length of the extruder was as follows: 400° F. (204° C.) at zone 1 (near the feed throat), 520° F. (271° C.) at zone 2, 550° F. (288° C.) at zone 3, and 550° F. (288° C.) at the die. The screw rotated at about 47 RPM, and the throughput was about 3.6 lbs. per hour (1.6 Kg/hr).

Standard ASTM test bars were injection molded on an Arburg All Rounder Injection Molding machine with a 35 ton clamp force. Typically, barrel temperature of about 260° C. and mold temperature of about 90° C. were used with a mold cycle time of about 9 seconds. Tensile and elongation properties were measured on ⅛ inch (3 mm) thick bars in accordance with ASTM procedure D-638, and Vicat Softening Temperature was measured on ⅛ inch (3 mm) thick bars in accordance with ASTM procedure D-1525-87 at 50° C./hour. Impact testing was conducted according to the protocol of ASTM D-256-90b, Reverse Notched Izod impact test (Test Method E).

Solubility tests using xylene and phenol/tetrachloroethane (60/40 v/v) were conducted to test the component polymer matrix formation of the resulting blends. The pellets of each experimental blend sample were first frozen in liquid nitrogen and impact fractured. The resulting fractured samples were refluxed for 16 hours in separate reflux apparati containing xylene or phenol/tetrachloroethane. Subsequently, the refluxed samples were examined by visual inspections and, where such visual inspections were not adequate, by scanning electronic microscopy for indications of solvent attack. The results are also shown in Table 1.

COMPARATIVE EXAMPLES C1–C2

The composition of comparative example C1 was formed by repeating the process outlined of producing the Example 6 composition except that a styrene-ethylene butadiene-styrene triblock copolymer was used in place of the glycidyl group-containing copolymer in accordance with the disclosure by Traugott et al, J. Appli. Polym. Sci., 28, 2947 (1983), cited above.

The composition of comparative example C2 was formed by extruding equal amounts of polyethylene terephthalate and high density polyethylene without the third, compatibilizer component in accordance with the process described above.

result of Vicat Softening Temperature test, demonstrate that the composition of the present invention has a superior heat stability than the compositions of the prior art (C1).

The insolubility of Examples 1 and 4 in xylene, as shown in Table 1, indicates that the resulting blends formed a continuous matrix of polyethylene terephthalate with dispersed domains of high density polyethylene whereas the solubility of C2, Example 2 and Example 5, which are compositions with no or low level of the compatibilizer component, indicates the absence of such polyethylene terephthalate continuous matrix formation. The results indicate that the compositions of Examples 2 and 5 do not have sufficient amount of the compatibilizer copolymer to facilitate the formation of a polyethylene terephthalate continuous matrix. As the amount of the glycidyl group-containing copolymer in the blend is increased, the resulting blend became soluble in xylene again, as shown in Example 6, indicating that there was a phase inversion and that the resulting blend formed a high density polyethylene continuous matrix with dispersed polyethylene terephthalate domains.

As can be seen from the above examples, the composition of the present invention provides improved impact properties and heat resistance. In addition, it has been discovered that the addition of the glycidyl group-containing copolymer within the preferred range facilitates the formation of continuous matrix of polyethylene terephthalate, which is believed to promote the improved heat resistance of the resulting blend, and that

TABLE 1

| Example | 1 | 2 | 3 | 4 | 5 | 6 | C1 | C2 |
|---|---|---|---|---|---|---|---|---|
| COMPOSITIONS: (weight %) | | | | | | | | |
| PET | 58.4 | 61.5 | 55.0 | 58.0 | 61.5 | 55.0 | 55.0 | 50.0 |
| HDPE | 31.6 | 33.5 | 30.0 | 31.9 | 33.5 | 30.0 | 30.0 | 50.0 |
| E/GMA I* | 10.0 | 5.0 | 15.0 | — | — | — | — | — |
| E/GMA II** | — | — | — | 10.0 | 5.0 | 15.0 | — | — |
| S/EB/S*** | — | — | — | — | — | — | 15.0 | — |
| PHYSICAL PROPERTIES: | | | | | | | | |
| Tensile Modulus | | | | | | | | |
| ($\times 10^3$, psi) | 186 | 191 | — | 175 | 179 | 159 | 176 | 261 |
| ($\times 10^6$, Pascal) | 1,282 | 1,317 | — | 1,207 | 1,234 | 1,096 | 1,213 | 1,800 |
| Tensile Strength | | | | | | | | |
| ($\times 10^3$, psi) | 4.7 | 3.6 | 4.6 | 4.7 | 4.0 | 3.7 | 3.7 | 3.7 |
| ($\times 10^6$, Pascal) | 32.4 | 24.8 | 31.7 | 32.4 | 27.6 | 25.5 | 25.5 | 25.5 |
| Elongation (%) | 13 | 4 | 5 | 11 | 4 | 11 | 4 | 2 |
| Reverse Notched Izod | | | | | | | | |
| (ft-lb/in) | 17.3 | 3.1 | — | 11.8 | 3.0 | 10.6 | 13.6 | 2.0 |
| (Joules/m) | 923.5 | 165.5 | — | 629.9 | 160.1 | 565.8 | 726.0 | 106.8 |
| Vicat Softening Temp. (°C.) | 158 | 120 | — | 184 | 119 | 113 | 92 | — |
| SOLUBILITY: | | | | | | | | |
| Xylene | no | yes | — | no | yes | yes | — | yes |
| Phenol/TCE | yes | no | — | yes | no | no | no | — |

*E/GMA I: 94% ethylene/6% glycidyl methacrylate copolymer (Bondfast ® 2C, Sumitomo Chemical)
**E/GMA II: 88% ethylene/12% glycidyl methacrylate copolymer (Bondfast ® E, Sumitomo Chemical)
***S/EB/S: styrene/70% ethylene-butadiene copolymer/styrene (Kraton G1652, Shell Chemical Co.)

The Notched Izod impact property data in Table 1 show that the blends having the glycidyl group-containing copolymer as the compatibilizer within the preferred range (Examples 1 and 4) have substantially improved impact properties over the blends containing no or insufficient amount of such a compatibilizer (Examples 2 and 5, and C1). Furthermore, the impact property results of Examples 1 and 4 when compared to Example 6 indicate that the addition of the compatibilizer beyond the preferred range does not improve, but deteriorates, the impact properties. Similar conclusion can also be seen from the elongation data. In addition, the high heat resistance of Examples 1 and 4, as indicated by the the addition of the glycidyl group-containing copolymer above the preferred range causes the phase inversion, rendering the resulting blend to have lower impact properties and heat resistance.

What is claimed is:

1. A thermoplastic blend comprising:
   a) from about 35 to about 72 weight percent by weight of said blend of a poly(alkylene terephthalate);
   b) from about 20 to about 50 weight percent by weight of said blend of a polyethylene homopolymer; and c) from about 8 to about 15 weight percent by weight of said blend of a compatibilizer copolymer, said copolymer comprising recurring monomeric units derived from an alpha-olefin having from 2 to about 10 carbon atoms and from about 0.4 to about 50 weight percent by weight of said copolymer of recurring monomeric units derived from an ethylenically unsaturated functional group-containing compound of the following structure:

$$R_1CH=C{\overset{R_2}{\underset{R_3}{\diagup\!\!\!\diagdown}}}$$

wherein $R_1$ and $R_2$ independently are H or an alkyl group having from 1 to about 12 carbon atoms, and $R_3$ is selected from the group consisting of:

$$-COOCH_2-CH\underset{O}{\overset{}{\diagdown\!\!\!\diagup}}CH_2$$

$$-\!\!\langle\bigcirc\rangle\!\!-N=C=O,$$

and $$-COOCH_2-CH_2-N=C=O,$$

wherein said poly(alkylene terephthalate) forms a continuous matrix having polyethylene domains dispersed therein.

2. The blend of claim 1, wherein said polyalkylene terephthalate is an amount of from about 50 to about 65 weight percent based on the total weight of said blend.

3. The blend of claim 1, wherein said polyethylene homopolymer is in an amount of from about 20 to about 40 weight percent based on the total weight of said blend composition.

4. The blend of claim 1, wherein said compatibilizer copolymer is in an amount of from about 8 to about 12 weight percent based on the total weight of said blend composition.

5. The composition of claim 1, wherein said polyalkylene terephthalate is selected from the group consisting of polyethylene terephthalate, polybutylene terephthalate and mixtures thereof.

6. The composition of claim 5, wherein said polyalkylene terephthalate is polyethylene terephthalate.

7. The composition of claim 1, wherein said polyethylene homopolymer is high density polyethylene.

8. The blend of claim 1, wherein said compatibilizer copolymer is selected from the group consisting of ethylene/glycidyl acrylate copolymers, ethylene/glycidyl methacrylate copolymers, ethylene/vinyl acetate/glycidyl methacrylate copolymers, and ethylene/vinyl acetate/glycidyl acrylate copolymers.

9. The composition of claim 8, wherein said compatibilizer copolymer is an ethylene-glycidyl methacrylate copolymer.

10. A thermoplastic blend comprising:

a) from about 35 to about 72 weight percent by weight of said blend of a polyalkylene terephthalate;

b) from about 20 to about 50 weight percent by weight of said blend of a polyethylene homopolymer; and c) from about 5 to about 15 weight percent by weight of said blend of a glycidyl group-containing copolymer comprising recurring monomeric units derived from an alpha-olefin having from 2 to about 10 carbon atoms and from about 0.4 to about 50 weight percent by weight of said copolymer of recurring monomeric units derived from a glycidyl ester of an alpha, beta-ethylenically unsaturated carboxylic acid, wherein said poly(alkylene terephthalate) forms a continuous matrix having polyethylene domains dispersed therein.

11. The composition of claim 10, wherein said polyalkylene terephthalate is polyethylene terephthalate.

12. The composition of claim 10, wherein said polyethylene homopolymer is high density polyethylene.

13. The composition of claim 10, wherein said glycidyl group-containing copolymer is an ethylene-glycidyl methacrylate copolymer.

14. A thermoplastic blend comprising:

a) from about 35 to about 72 weight percent by weight of said blend of a polyalkylene terephthalate;

b) from about 20 to about 50 weight percent by weight of said blend of a polyethylene homopolymer; and c) from about 5 to about 15 weight percent by weight of said blend of an isocyanate functional group-containing copolymer, said copolymer comprising recurring monomeric units derived from an alpha-olefin having from 2 to about 10 carbon atoms and from about 0.4 to about 50 weight percent by weight of said copolymer of recurring monomeric units derived from an ethylenically unsaturated isocyanate functional group-containing monomer of the following structure:

$$R_1CH=C{\overset{R_2}{\underset{R_3-N=C=O}{\diagup\!\!\!\diagdown}}}$$

wherein $R_1$ and $R_2$ independently are H or an alkyl group having from 1 to about 12 carbon atoms, and $R_3$ is phenylene or $-COOCH_2-CH_2-$.

15. The composition of claim 14, wherein said polyalkylene terephthalate is polyethylene terephthalate.

16. The composition of claim 14, wherein said polyethylene homopolymer is high density polyethylene.

17. An article formed from a thermoplastic blend comprising:

a) from about 35 to about 72 weight percent by weight of said blend of a poly(alkylene terephthalate);

b) from about 20 to about 50 weight percent by weight of said blend of a polyethylene homopolymer; and c) from about 5 to about 15 weight percent by weight of said blend of a compatibilizer copolymer, said copolymer comprising recurring monomeric units derived from an alpha-olefin having from 2 to about 10 carbon atoms and from about 0.4 to about 50 weight percent by weight of said copolymer of recurring monomeric units derived from an ethylenically unsaturated functional group-containing compound of the following structure:

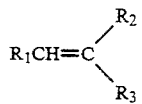

wherein

R₁ and R₂ independently are H or an alkyl group having from 1 to about 12 carbon atoms, and R₃ is selected from the group consisting of:

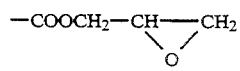

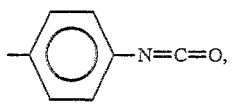

and

—COOCH₂—CH₂—N=C=O, wherein said poly(alkylene terephthalate) forms a continuous matrix having polyethylene domains dispersed therein.

18. The composition of claim 17, wherein said polyalkylene terephthalate is polyethylene terephthalate.

19. The composition of claim 17, wherein said polyethylene homopolymer is high density polyethylene.

20. The composition of claim 17, wherein said compatibilizer copolymer is an ethylene-glycidyl methacrylate copolymer.

* * * * *